United States Patent
Chen

(10) Patent No.: US 10,351,017 B1
(45) Date of Patent: Jul. 16, 2019

(54) BATTERY BOX LOCKING STRUCTURE OF ELECTRIC VEHICLE

(71) Applicant: KWANG YANG MOTOR CO., LTD., Kaohsiung (TW)

(72) Inventor: Yi-Tso Chen, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 0 days.

(21) Appl. No.: 16/247,571

(22) Filed: Jan. 15, 2019

(30) Foreign Application Priority Data

Jan. 31, 2018  (TW) .............................. 107103527 A

(51) Int. Cl.
| | |
|---|---|
| *B60K 1/04* | (2019.01) |
| *B60L 50/64* | (2019.01) |
| *H01M 2/10* | (2006.01) |
| *B60L 50/60* | (2019.01) |
| *B60R 25/40* | (2013.01) |

(52) U.S. Cl.
CPC ................ *B60L 50/64* (2019.02); *B60K 1/04* (2013.01); *B60L 50/66* (2019.02); *B60R 25/40* (2013.01); *H01M 2/1083* (2013.01); *B60K 2001/0416* (2013.01); *B60K 2001/0488* (2013.01); *B62K 2202/00* (2013.01)

(58) Field of Classification Search
CPC ................ B60K 1/04; B60K 2202/00; B60K 2001/0488; B60K 2001/0416; B60L 50/64; B60L 50/66; H01M 2/1083; B60R 25/40
See application file for complete search history.

(56) References Cited

U.S. PATENT DOCUMENTS

| | | | | |
|---|---|---|---|---|
| 5,421,427 A * | 6/1995 | Ogawa | .................... | B60L 53/18 180/220 |
| 5,513,721 A * | 5/1996 | Ogawa | .................... | B62K 19/46 180/220 |
| 5,853,058 A * | 12/1998 | Endo | ........................ | B62M 7/00 180/65.1 |
| 6,428,925 B1 * | 8/2002 | Takeno | ................. | H01M 2/105 429/159 |
| 6,568,496 B1 * | 5/2003 | Huang | ................... | B62K 11/00 180/220 |
| 7,249,644 B2 * | 7/2007 | Honda | .................... | B60K 1/00 180/65.51 |
| 7,931,110 B2 * | 4/2011 | Nishiura | ................. | B60L 58/26 180/220 |

(Continued)

*Primary Examiner* — James A Shriver, II
*Assistant Examiner* — James J Triggs
(74) *Attorney, Agent, or Firm* — Leong C. Lei

(57) ABSTRACT

An electric vehicle includes a frame unit and a vehicle body cover unit. The vehicle body cover unit includes a thread board shielding left and right tread tubes of the frame unit between which a receiving space is defined to receive a battery box that receives and holds a battery. The battery box has two sides provided with support shafts. The battery box is rotatable between an open position and a storage position. A locking device is selectively set in releasable engagement with a positioning member provided on the battery box so as to selectively lock the battery box in the storage position. An operation unit is provided for controlling the locking device to engage with or disengage from the positioning member so as to allow the battery box to rotate from the storage position to the open position.

30 Claims, 14 Drawing Sheets

(56) References Cited

U.S. PATENT DOCUMENTS

| | | | | |
|---|---|---|---|---|
| 8,167,070 B2* | 5/2012 | Takamura | B60K 1/04 | 180/68.5 |
| 8,376,075 B2* | 2/2013 | Sasage | B62K 11/10 | 180/220 |
| 8,813,891 B2* | 8/2014 | Tsukamoto | B62M 7/12 | 180/220 |
| 2002/0005305 A1* | 1/2002 | Hirayama | B62K 11/00 | 180/68.5 |
| 2003/0230440 A1* | 12/2003 | Kamen | F24D 15/04 | 180/65.245 |
| 2012/0000720 A1* | 1/2012 | Honda | B62K 11/10 | 180/65.1 |
| 2012/0081220 A1* | 4/2012 | Tamaki | B60Q 5/008 | 340/435 |
| 2013/0136956 A1* | 5/2013 | Nakano | H01M 2/105 | 429/7 |
| 2013/0228389 A1* | 9/2013 | Nakashima | B62K 11/10 | 180/220 |
| 2013/0264134 A1* | 10/2013 | Matsuda | B60K 1/04 | 180/68.1 |

* cited by examiner

BATTERY BOX LOCKING STRUCTURE OF ELECTRIC VEHICLE

(a) TECHNICAL FIELD OF THE INVENTION

The present invention generally relates to a battery box locking structure of an electric vehicle, and more particularly to a battery box locking structure of an electric vehicle that improves easiness of locking operation and burglarproofness of a battery box.

(b) DESCRIPTION OF THE PRIOR ART

An electric vehicle 1 is often provided with a receiving space 12 under a tread board 11 that is arranged for supporting user's feet to rest thereon. As shown in FIG. 1, the receiving space 12 receives and holds therein a battery 13 that supplies electrical power source to the electric vehicle 1. The battery 13 is received and stored in a battery box 14.

As shown in FIG. 2, to make the battery 13 burglarproof, manufacturers have proposed an electric vehicle in TW533150 patent. The electric vehicle patent of TW533150 generally provides a tread board 11 having an end pivotally connected and an opposite end provided with a lock 15. Locking achieved with the lock 15 prevents the tread board 11 from being readily lifted open, so as to offer easy burglarproofness as being received and stored in the receiving space 12.

Although storage of the battery 13 as provided in the above known electric vehicle 1 provides the battery 13 with easiness of storage and easy burglarproofness, since the lock 15 is arranged at an end of the tread board 11, the lock 15 may be easily contaminated as being treaded by a user and may also be stained by external dust. On the one hand, the lock 15 may be readily soiled and damaged and become hard to unlock and a user may get the soil attached in opening the lock 15, and on the other hand, the lock 15, being a simply structured lock that is exposed, may be of insufficiency in burglarproofness.

Thus, it is a challenge of the electric vehicle industry to provide a battery box locking structure of an electric vehicle that helps improve withdrawal and burglarproofness of a battery of an electric vehicle.

SUMMARY OF THE INVENTION

The primary objective of the present invention is to provide a battery box locking structure of an electric vehicle, which helps overcome the drawbacks of inconvenience of locking operation and poor burglarproofness of a conventional battery box of an electric vehicle.

For such a purpose, the primary technical solution of the present invention as proposed in claim 1 is to provide a battery box locking structure of an electric vehicle, wherein the electric vehicle at least comprises a frame unit and a vehicle body cover unit that covers the frame unit; the frame unit comprises tread tubes and rear frames extending toward a rear side of a vehicle body, the tread tubes being arranged in a left and right pairwise form as a left tread tube and a right tread tube; the vehicle body cover unit at least comprises a tread board that shields the left tread tube and the right tread tube; a receiving space is defined under the tread board and receiving space receives therein a battery box, the battery box receiving and holding therein a battery that supplies electrical power to a driving motor that drives the electric vehicle, wherein the battery box has two sides that are provided with support shafts, and the battery box are shaft-supported on the left tread tube and the right tread tube by the support shafts in a vehicle body left-right direction, so that the battery box is rotatable about a rotation center defined by the support shafts in a vehicle body front-rear direction to an open position or a storage position; a locking device is mounted to the frame unit and the locking device is connected to a control cable, the control cable being connected to an operation unit; a positioning member is provided on an outside of the battery box and the locking device is operable to hook and lock the positioning member so that the operation unit is operable to cause the locking device to hook and lock the positioning member or to release the positioning member from being hooked and locked.

For such a purpose, the primary technical solution of the present invention as proposed in claim 2 is to provide a battery box locking structure of an electric vehicle, wherein the electric vehicle at least comprises a frame unit and a vehicle body cover unit that covers the frame unit; the frame unit comprises tread tubes and rear frames extending toward a rear side of a vehicle body, the tread tubes being arranged in a left and right pairwise form as a left tread tube and a right tread tube; the vehicle body cover unit at least comprises a tread board that shields the left tread tube and the right tread tube; a receiving space is defined under the tread board and receiving space receives therein a battery box, the battery box receiving and holding therein a battery that supplies electrical power to a driving motor that drives the electric vehicle, wherein the battery box has two sides that are provided with support shafts, and the battery box are shaft-supported on the left tread tube and the right tread tube by the support shafts in a vehicle body left-right direction, so that the battery box is rotatable about a rotation center defined by the support shafts in a vehicle body front-rear direction to an open position or a storage position; the frame unit comprises a transverse tube and a locking device is mounted to the transverse tube, a positioning member being provided on an outside of the battery box; the locking device is connected to a control cable, the control cable being connected to an operation unit; the locking device is operable to hook and lock the positioning member so that the operation unit is operable to cause the locking device to hook and lock the positioning member or to release the positioning member from being hooked and locked.

For such a purpose, the primary technical solution of the present invention as proposed in claim 3 is to provide a battery box locking structure of an electric vehicle, wherein the rear frames comprise rise sections and side frame sections, a transverse tube being arranged on the rise sections, the locking device being mounted to the transverse tube; and the positioning member is provided on an external upper surface of the battery box at a location closer to the rear side of the vehicle body than the support shafts of the battery box.

For such a purpose, the primary technical solution of the present invention as proposed in claim 4 is to provide a battery box locking structure of an electric vehicle, wherein the locking device is arranged on the transverse tube in a manner of slightly inclining in a direction toward the rear side of the vehicle body and the battery box and the positioning member is arranged on the external surface of the battery box in a manner of slightly inclining toward a front side of the vehicle body.

For such a purpose, the primary technical solution of the present invention as proposed in claim 5 is to provide a battery box locking structure of an electric vehicle, wherein the locking device comprises a positioning seat, a positioning hook pivotally mounted on the positioning seat, a torsion spring arranged at one side of the positioning hook to cause the positioning hook to take a position returning operation, and a constraint slide block that is mounted on the positioning seat and constrains the positioning hook to locking engagement and locking release, the positioning member being a U-shaped buckle.

For such a purpose, the primary technical solution of the present invention as proposed in claim 6 is to provide a battery box locking structure of an electric vehicle, wherein an article storage box is mounted on the frame unit and the locking device s arranged between the article storage box and the battery box.

For such a purpose, the primary technical solution of the present invention as proposed in claim 7 is to provide a battery box locking structure of an electric vehicle, wherein the constraint slide block has an end connected to the control cable and the control cable is connected to the operation unit, the operation unit being a main switch lock or a pull bar or a button.

For such a purpose, the primary technical solution of the present invention as proposed in claim 8 is to provide a battery box locking structure of an electric vehicle, wherein the constraint slide block has an end connected to the control cable, the control cable being connected to an electro-mechanical controller, the electro-mechanical controller being connected to the operation unit, the operation unit being a main switch lock or a bar or an electronic switch.

For such a purpose, the primary technical solution of the present invention as proposed in claim 9 is to provide a battery box locking structure of an electric vehicle, wherein the frame unit comprises a seat section, and the vehicle body cover unit comprises a central vehicle body cover; the central vehicle body cover is arranged at a lower side of a front end of the seat section, the battery box being received in the receiving space defined by the left tread tube, the right tread tube, the tread board and a bottom cover, at least a portion of a rear end of the battery box extending further toward the rear side of the vehicle body than the central vehicle body cover.

For such a purpose, the primary technical solution of the present invention as proposed in claim 10 is to provide a battery box locking structure of an electric vehicle, wherein a bottom cover is arranged below of the tread board; the tread board is fixed to an upper surface of the battery box and the bottom cover is fixed to a lower surface of the battery box; the tread board on the upper surface of the battery box and the bottom cover on the lower surface of the battery box are openable in synchronization with the battery box, so that when the battery box is opened to a condition of being generally at a right angle with respect to a ground surface, a rear end of the battery box projects beyond a lower edge of the receiving space in a direction toward the ground surface.

For such a purpose, the primary technical solution of the present invention as proposed in claim 11 is to provide a battery box locking structure of an electric vehicle, wherein the frame unit comprises side frame sections arranged in a left and right pairwise form, an article storage box being provided on the side frame sections of the frame unit, the battery box being shaft-supported on the side frame sections of the frame unit in a manner of being shaft-supported in the vehicle body left-right direction, and is received in the article storage box.

For such a purpose, the primary technical solution of the present invention as proposed in claim 12 is to provide a battery box locking structure of an electric vehicle, wherein the frame unit further comprises a head tube, the head tube of the frame unit being provided with a mounting frame, the battery box being shaft-supported on the mounting frame in a manner of being shaft-supported in the vehicle body left-right direction.

For such a purpose, the primary technical solution of the present invention as proposed in claim 13 is to provide a battery box locking structure of an electric vehicle, wherein the electro-mechanical controller comprises an electromagnetic valve; the operation unit controls operation of the electromagnetic valve, the electromagnetic valve driving the control cable, the control cable causing the constraint slide block to release a constrained condition of the positioning hook to allow the positioning hook to release a hooking state.

The efficacy that the primary technical solution of the present invention proposed in claim 1 may achieve is that easiness of lifting and removal of a battery is improved and an effect of locking and positioning of a battery box is ensured so that burglarproofness of a battery is enhanced.

The efficacy that the primary technical solution of the present invention proposed in claim 2 may achieve is that easiness of lifting and removal of a battery is improved and an effect of locking and positioning of a battery box is ensured so that burglarproofness of a battery is enhanced.

The efficacy that the primary technical solution of the present invention proposed in claim 3 may achieve is that easiness of arrangement of the locking device and the positioning member can be enhanced and a space of the electric vehicle can be fully used.

The efficacy that the primary technical solution of the present invention proposed in claim 4 may achieve is that an effect of locking between the locking device and the positioning member can be enhanced and a space of the electric vehicle can be fully used.

The efficacy that the primary technical solution of the present invention proposed in claim 5 may achieve is that an effect of locking between the locking device and the positioning member can be enhanced.

The efficacy that the primary technical solution of the present invention proposed in claim 6 may achieve is that a space of the electric vehicle can be fully used.

The efficacy that the primary technical solution of the present invention proposed in claim 7 may achieve is that operability of the locking device can be enhanced.

The efficacy that the primary technical solution of the present invention proposed in claim 8 may achieve is that operability of the locking device can be enhanced.

The efficacy that the primary technical solution of the present invention proposed in claim 9 may achieve is that a battery box, after being enlarged, interfering with other components can be avoided, thereby enhancing utilization of the battery box.

The efficacy that the primary technical solution of the present invention proposed in claim 10 may achieve is that withdrawal of a battery from a battery box by a user is made easy and at the same time, the battery box, after being enlarged, interfering with other components can be avoided, thereby enhancing utilization of the battery box.

The efficacy that the primary technical solution of the present invention proposed in claim 11 may achieve is that a space of the electric vehicle can be fully used and a battery received in a battery box is provided with a feature of shielding.

The efficacy that the primary technical solution of the present invention proposed in claim 12 may achieve is that a space of the electric vehicle can be fully used and a battery received in a battery box is provided with a feature of shielding.

The efficacy that the primary technical solution of the present invention proposed in claim 13 may achieve is that operability of a locking device is enhanced.

DETAILED DESCRIPTION OF THE PREFERRED EMBODIMENTS

Figure 1:
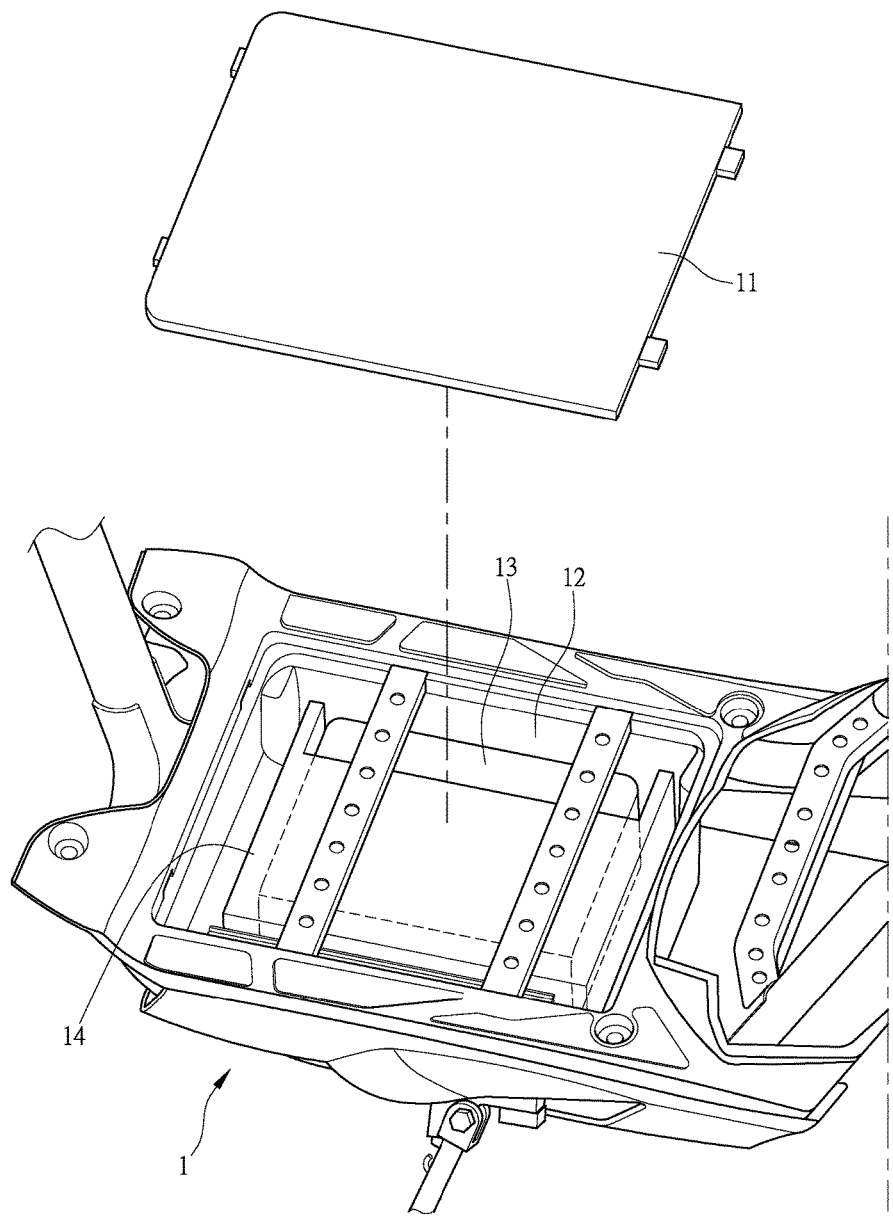
FIG. 1 is a schematic view illustrating a conventional electric vehicle battery box.
Figure 2:
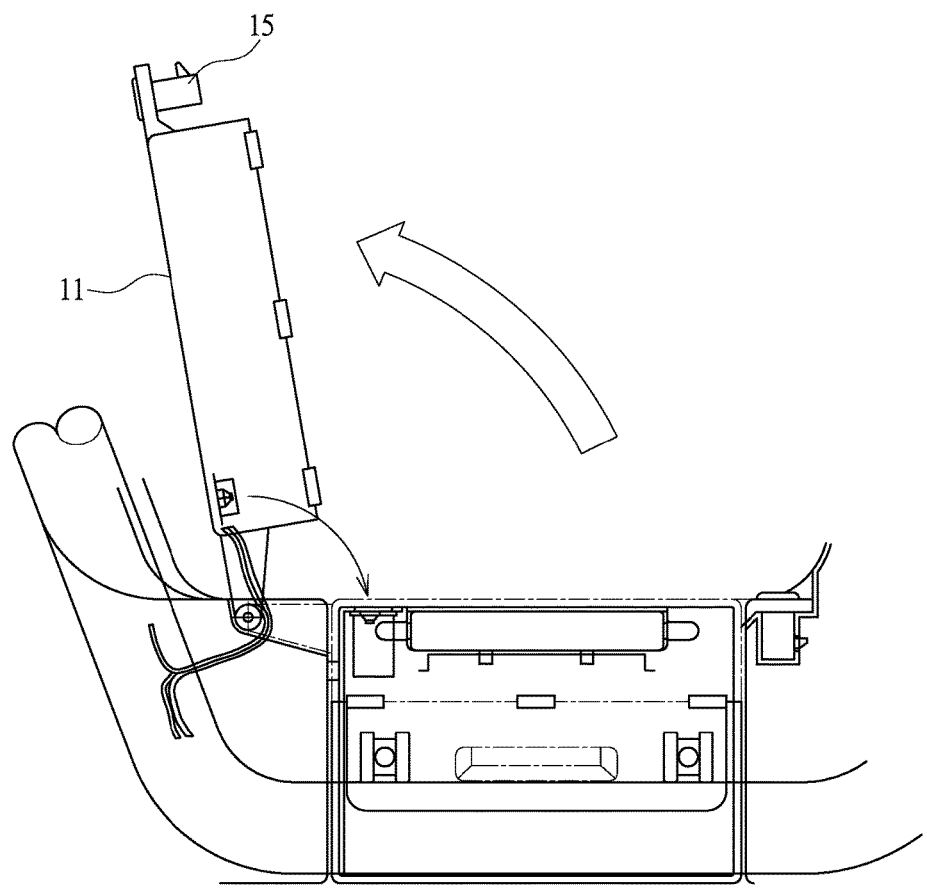
FIG. 2 illustrates the prior art patent document of TW533150.
Figure 3:
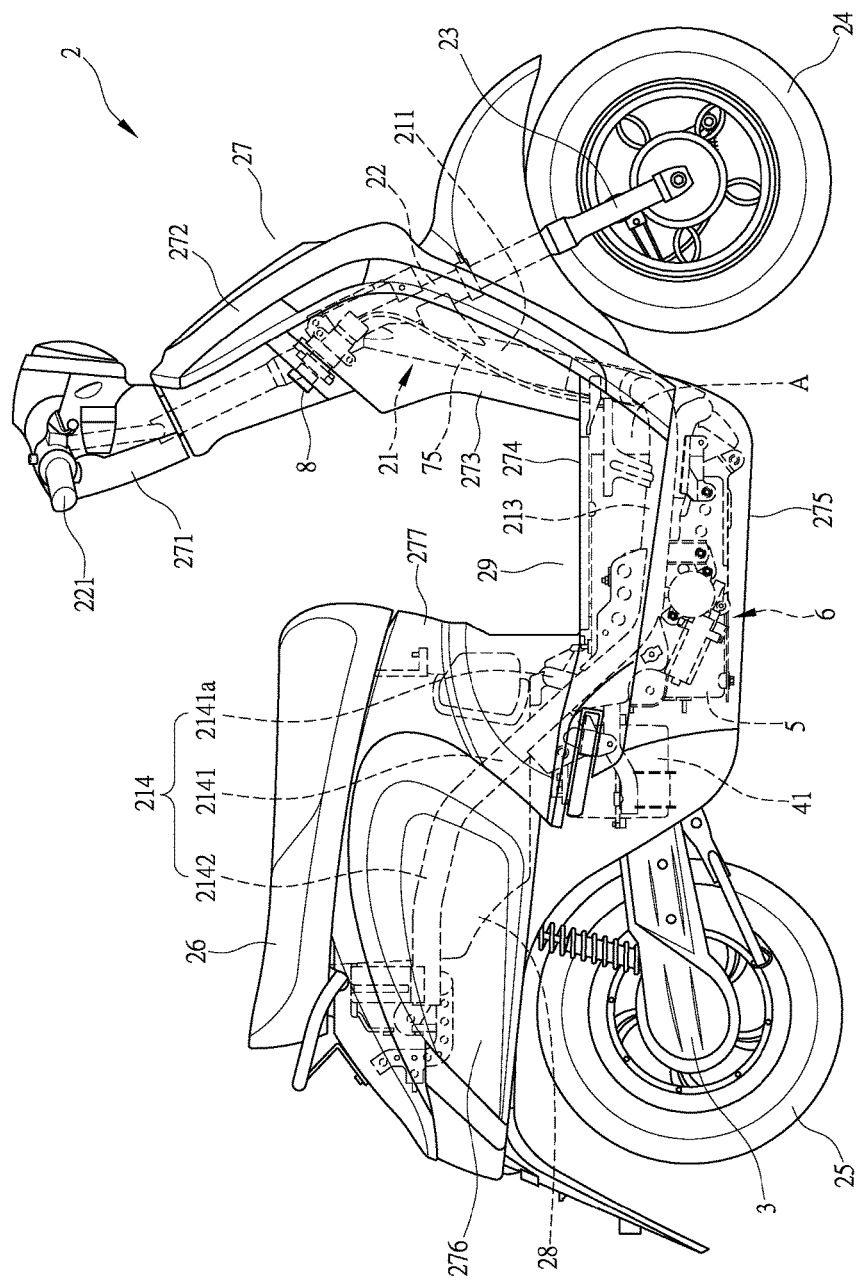
FIG. 3 is a side elevational view illustrating an electric vehicle according to the present invention.
Figure 4:
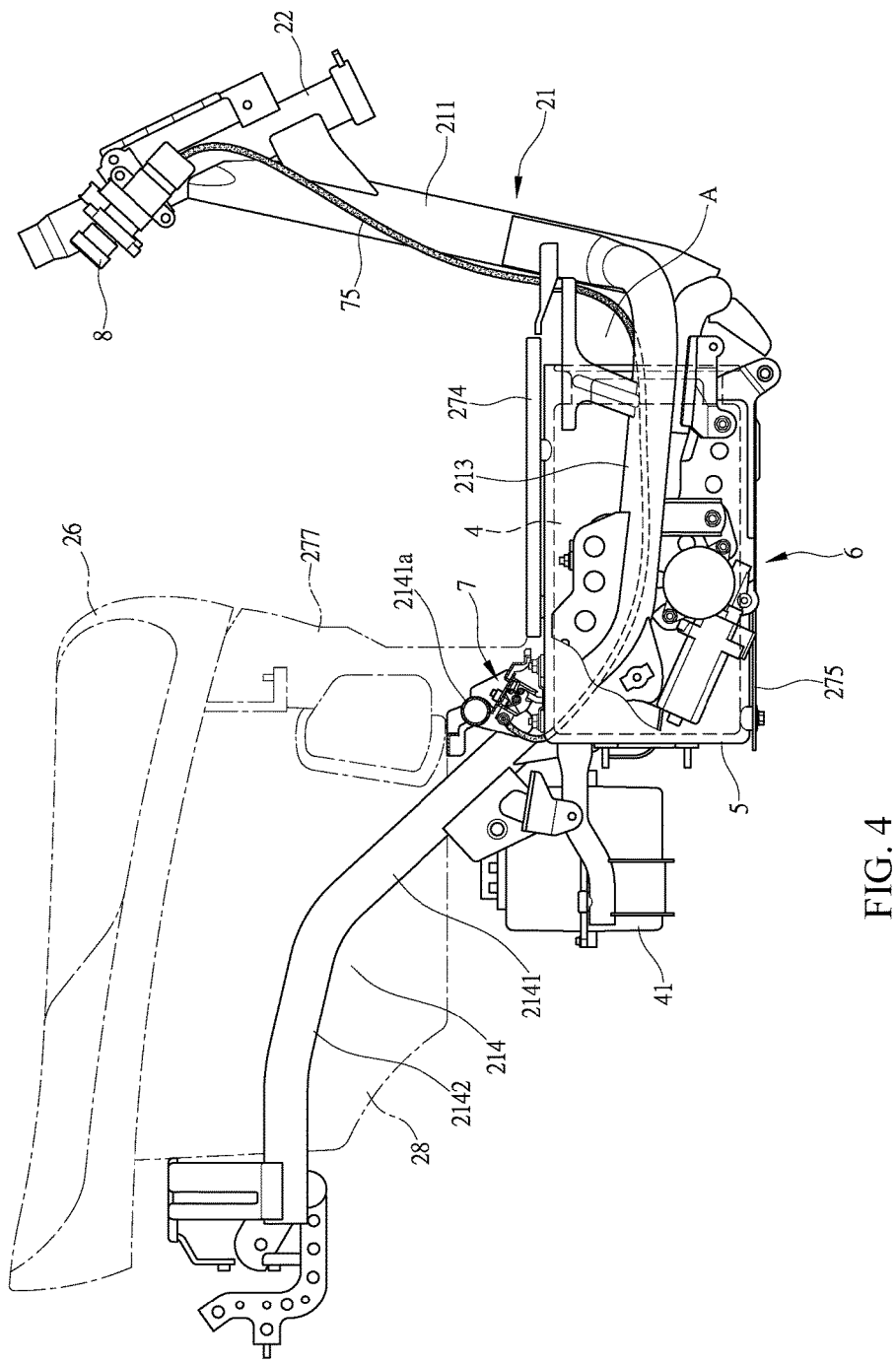
FIG. 4 is a schematic view illustrating an arrangement of a battery box of the electric vehicle according to the present invention.
Figure 5:
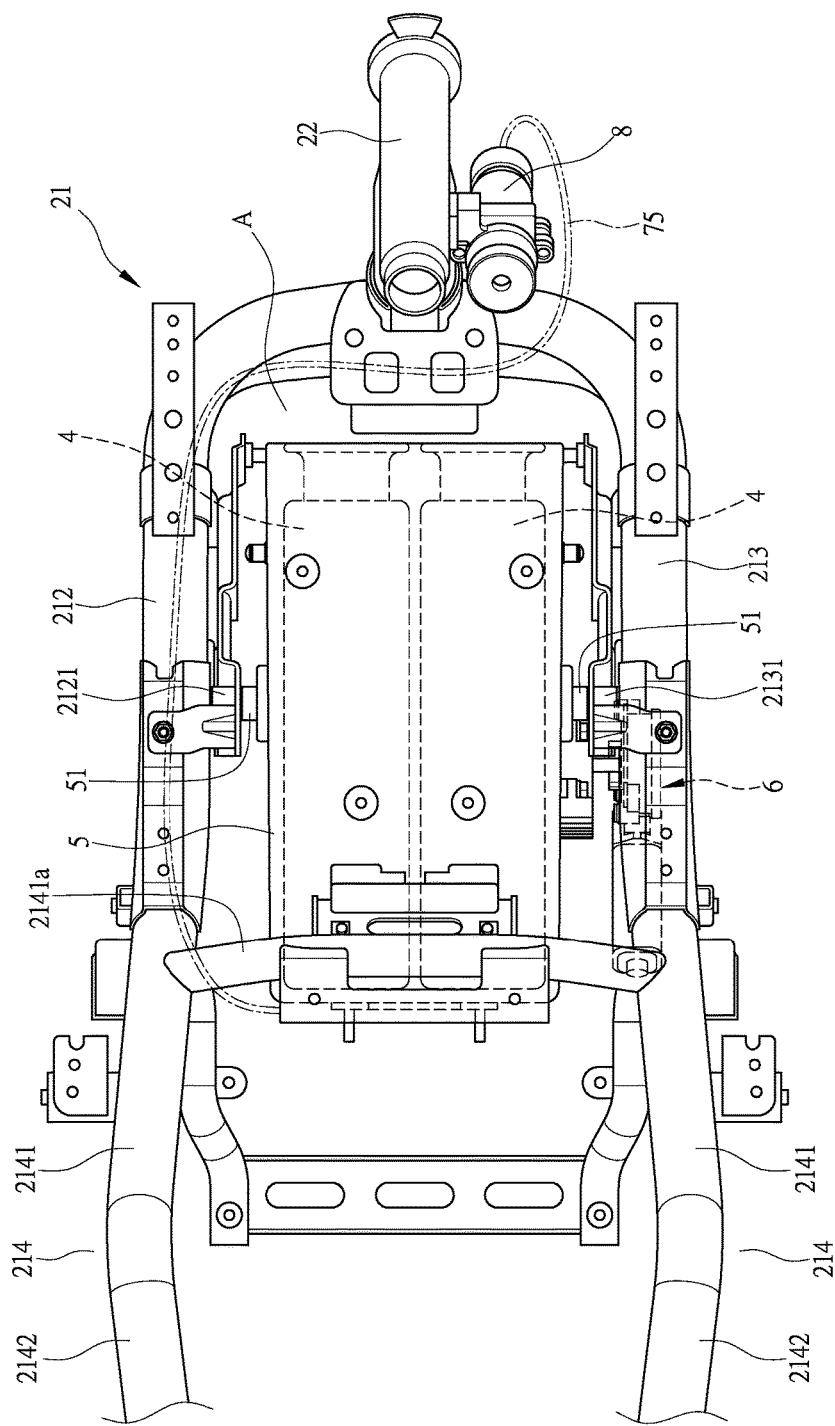
FIG. 5 is a top plan view illustrating the arrangement of the battery box of the electric vehicle according to the present invention.
Figure 6:
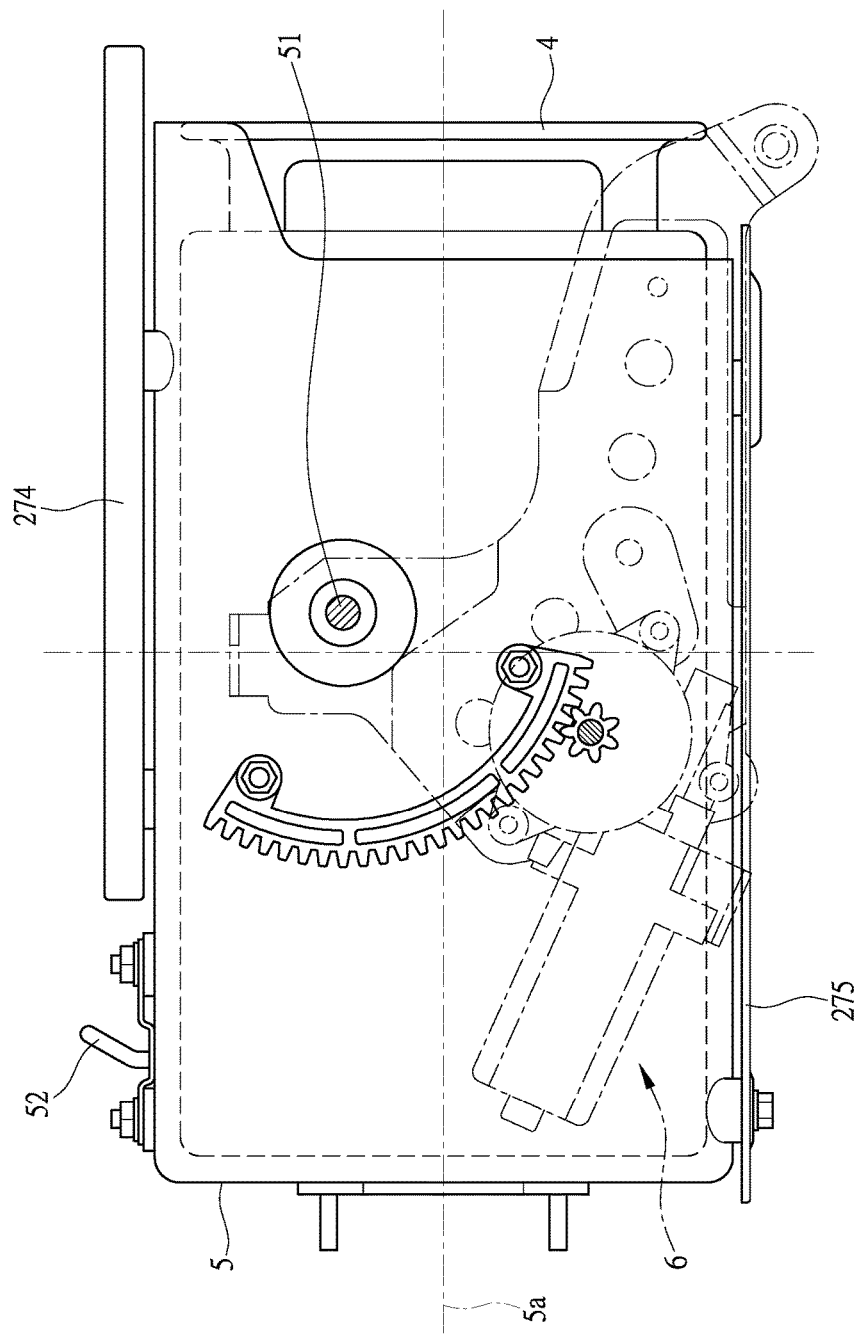
FIG. 6 is a side elevational view, in a schematic form, illustrating the battery box of the electric vehicle according to the present invention.
Figure 7:
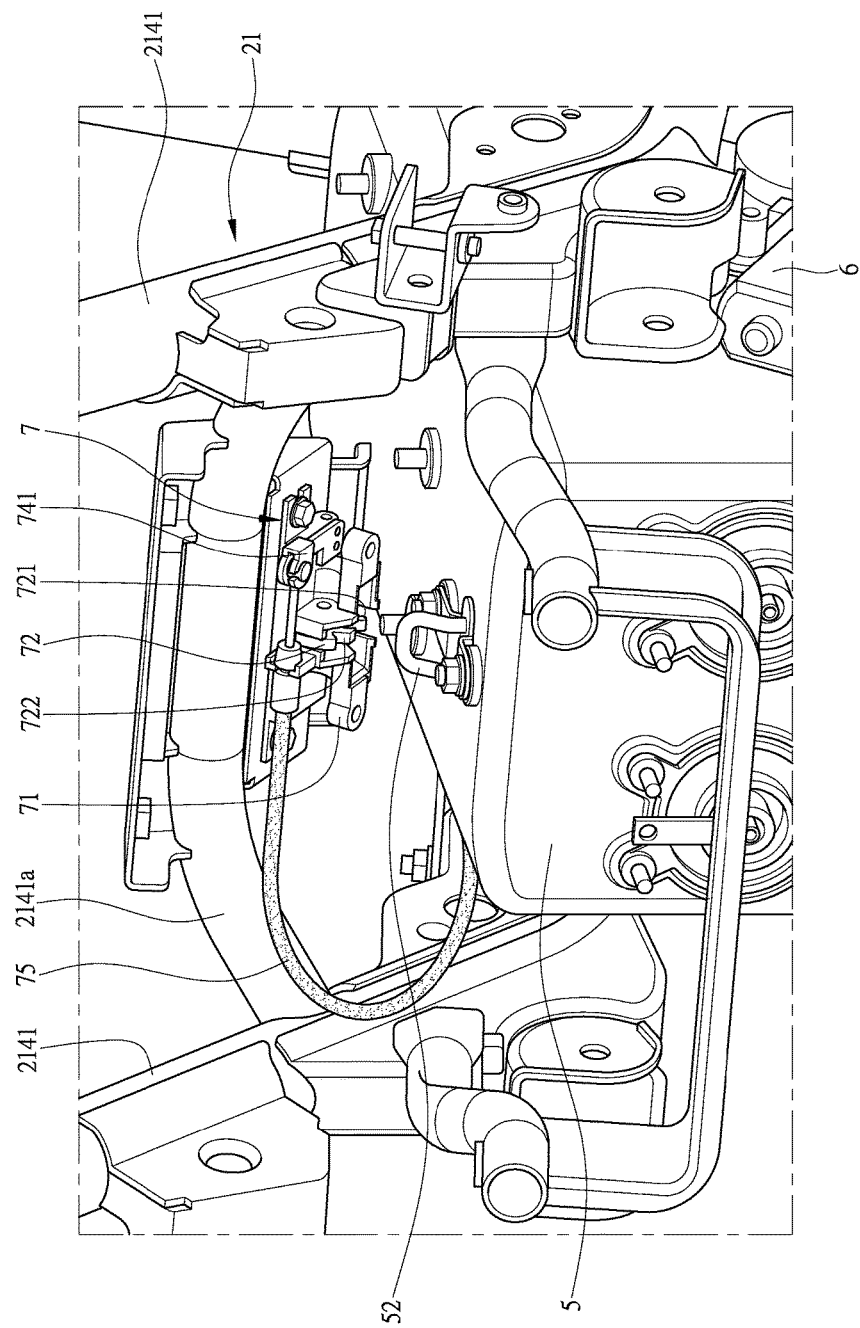
FIG. 7 is a rear view, in a schematic form, illustrating a positioning member and a locking device of the battery box according to the present invention.
Figure 8:
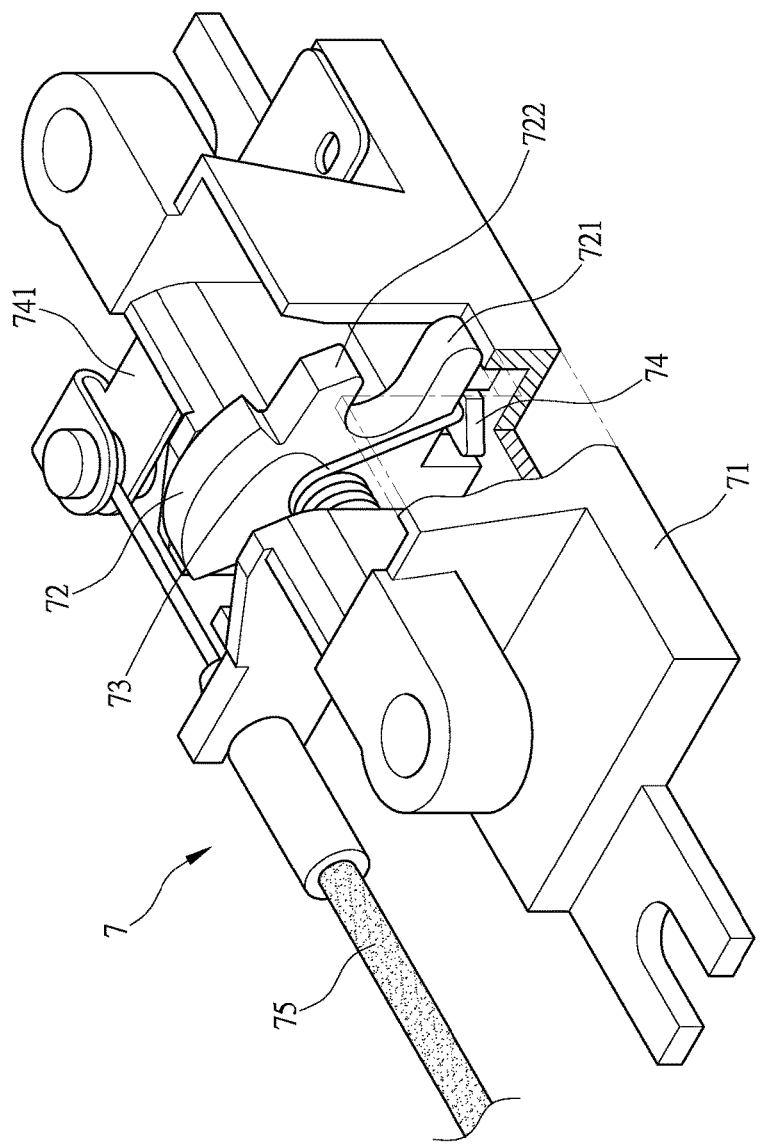
FIG. 8 is a perspective view illustrating the locking device according to the present invention.

Firstly, referring to FIGS. 3, 4, and 5, the present invention provides a battery box locking structure of an electric vehicle. A frame unit 21 of the electric vehicle 2 is provided, at a front side, with a head tube 22. The head tube 22 is provided, at an upper side thereof, with a steering mechanism 221. The steering mechanism 221 is connected, at a lower side thereof, to a front fork unit (front shock absorber) 23. The front fork unit 23 is provided, at a lower side thereof and in a rotatable manner, with a front wheel 24. The frame unit 21 is provided with a main tube 211 extending from the head tube 22 in a direction toward a rear side of a vehicle body. The main tube 211 is provided, as being further extended toward the rear side of the vehicle body, with tread tubes. The tread tubes are arranged pairwise in a left-right direction as a left tread tube 212 and a right tread tube 213. The left tread tube 212 and the right tread tube 213 are provided with rear frames 214 that are arranged pairwise in the left-right direction and extend toward the rear side of the vehicle body. The rear frames 214 comprise a rise section 2141 and a side frame section 2142. A transverse tube 2141a is arranged between the rise sections 2141. A rear wheel 25 is arranged rearward of and under the rear frames 214. A driving motor 3 is arranged at one side of the rear wheel 25 such that the driving motor 3 is operable to drive the rear wheel 25 in order to cause the electric vehicle 2 to more forward. A seat section 26 that is located above the rear wheel 25 is arranged rearward of the steering mechanism 221 such that a spacing distance is provided between the seat section 26 and the steering mechanism 221. The electric vehicle 2 is provided, on an outside thereof, with a vehicle body cover unit 27. The vehicle body cover unit 27 comprises a head cover 271 housing the steering mechanism 221, a front head cover 272 arranged at a lower side of the head cover 271 and housing a front end of the vehicle body, and a knee-shielding cover 273 arranged at a rear side of the front head cover 272. A tread board 274 is arranged between the steering mechanism 221 and the seat section 26 at a lower side thereof. A bottom cover 275 is arranged at a lower side of the tread board 274. The electric vehicle 2 is provided, on two sides thereof, with side vehicle body covers 276 at a lower side of the seat section 26. A central vehicle body cover 277 is provided in front of and at a lower side of the seat section 26. An article storage box 28 is provided at a lower side of the seat section 26 and an upper side of the article storage box 28 is shielded by the seat section 26. The electric vehicle 2 is provided with a power source, of which an example that is shown in the drawings includes a driving motor 3 driving the rear wheel 25. In practice, the electric vehicle 2 of the present invention can alternatively provided with a frontward-arranged motor that drives, by means of a chain or a belt, the rear wheel 25, or a driving mechanism that is made up of a motor and a transmission box to drive the rear wheel 25. It is noted here that the present invention is not limited to the specific way of driving the rear wheel 25 with the driving motor 3.

As shown in FIGS. 3, 4, and 5, the tread board 274 forms a foot support section 29, and the foot support section 29 functions to receive a rider's feet to place thereon. The tread board 274, the bottom cover 275, and the left tread tube 212 and the right tread tube 213 define a receiving space A. The receiving space A receives therein a battery box 5, and the battery box 5 functions to receive and hold therein a battery 4. The battery 4 is electrically connected with the driving motor 3, in order to provide electrical power to the driving motor 3 to drive the rear wheel 25 to rotate. As such, a control device (not shown in the drawings) provided on the steering mechanism 221 can be operated to activate the driving motor 3 to drive the rear wheel 25 to rotate so as to cause the electric vehicle 2 to move.

As shown in FIGS. 3, 4, 5, and 6, the battery box 5 is received in the receiving space A defined by the tread board 274, the bottom cover 275, the left tread tube 212 and the right tread tube 213 in a manner of being arranged in a vehicle body front-rear direction of the electric vehicle 2. The left tread tube 212 is provided with a left shaft support section 2121, and the right tread tube 213 is provided with a right shaft support section 2131. Speaking more specifically, the battery box 5 is provided, on two opposite sides thereof, with support shafts 51 projecting therefrom in a vehicle body left-right direction. The support shafts 51 that are arranged on the two sides of the battery box 5 are arranged above a battery box center axis 5a of the battery box 5 that extends in the vehicle body front-rear direction. As such, the battery box 5 is shaft-supported by the support shafts 51 in the vehicle body left-right direction on the left shaft support section 2121 of the left tread tube 212 and the right shaft support section 2131 of the right tread tube 213. An upper surface of the battery box 5 is fixed to the tread board 274, and a lower surface of the battery box 5 is fixed to the bottom cover 275. One side of the battery box 5 is provided with an opening device 6.

As shown in FIGS. 3, 4, 5, and 6, an electrical power source of the opening device 6 is supplied with a second battery 42 arranged at a lower side of a front portion of the article storage box 28. Further, the steering mechanism 221 is provided with a control button (not shown in the drawings) that controls operation of the opening device 6. As such, the control button can be operated to put the opening device 6 into operation for causing the battery box 5 to rotate, about a rotation center defined by the support shafts 51, toward the vehicle body front-rear direction, to an open position or a storage position in order to be opened in a condition of generally defining a right angle with respect to a ground surface, thereby allowing a user to withdraw and remove the battery 4 from the battery box 5. The opening device 6 can be arranged at the left side or the right side of the battery box 5, and in other words, the opening device 6 can be arranged on the left tread tube 212 or the right tread tube 213. Being arranged on the right tread tube 213 as shown in the instant embodiment is taken as an example for illustration; however, this invention is not limited to such an embodiment.

As shown in FIGS. 4, 6, 7, and 8, the battery box 5 is provided on an external upper surface thereof with a positioning member 52 facing a rear side of the vehicle body. The positioning member 52 is arranged on the external upper surface of the battery box 5 and located closer to the rear side of the vehicle body than the support shafts 51 of the battery box 51. The positioning member 52 is embodied as a U-shaped buckle. The positioning member 52 is arranged in a manner of slightly inclining toward a frontward direction of the vehicle body. A locking device 7 is provided on the transverse tube 2141a that is arranged between the rise sections 2141 of the frame unit 21. The locking device 7 is arranged on the transverse tube 2141a in a manner of slightly inclining in a direction toward the rearward direction of the vehicle body and the battery box 5. Further, as viewed from a lateral side, the locking device 7 is located between the article storage box 28 and the battery box 5. The locking device 7 comprises a positioning seat 71, a positioning hook 72 pivotally mounted on the positioning seat 71, a torsion spring 73 arranged at one side of the positioning hook 72 to provide the positioning hook 72 with a returning operation, and a constraint slide block 74 that is mounted on the positioning seat 71 and constrains the positioning hook 72 to locking engagement and locking release. As viewed in a lateral side, the positioning seat 71 is mounted on the transverse tube 2141a in a manner of downward inclining so that the positioning hook 72 can be arranged in a manner of inclining toward the frontward direction of the vehicle body to allow the positioning hook 72 to smoothly hook on and lock to the positioning member 52 of the battery box 5. The constraint slide block 74 of the locking device 7 has an end that is provided with a connection section 741. The connection section 741 is connected to a control cable 75. An opposite end of the control cable 75 is connected to a main switch lock or a pull bar or a button of an operation unit 8 at one side of the head tube 22. A main switch lock is taken as an example of the operation unit 8 in the drawings for illustration. As such, the operation unit 8 may drive the control cable 75 to move to cause the constraint slide block 75 to release a constrained condition of the positioning hook 72 so that the positioning hook 72 may be, under the action of a spring force of the torsion sprint 73, released from a hooking state. With the above-described operation unit 8 driving the control cable 75 to move, the control cable 75 may make the constraint slide block 74 release the constrained condition of the positioning hook 72 to thereby release the positioning hook 72 from the hooking state to achieve a mechanical control measure.

Figure 9:
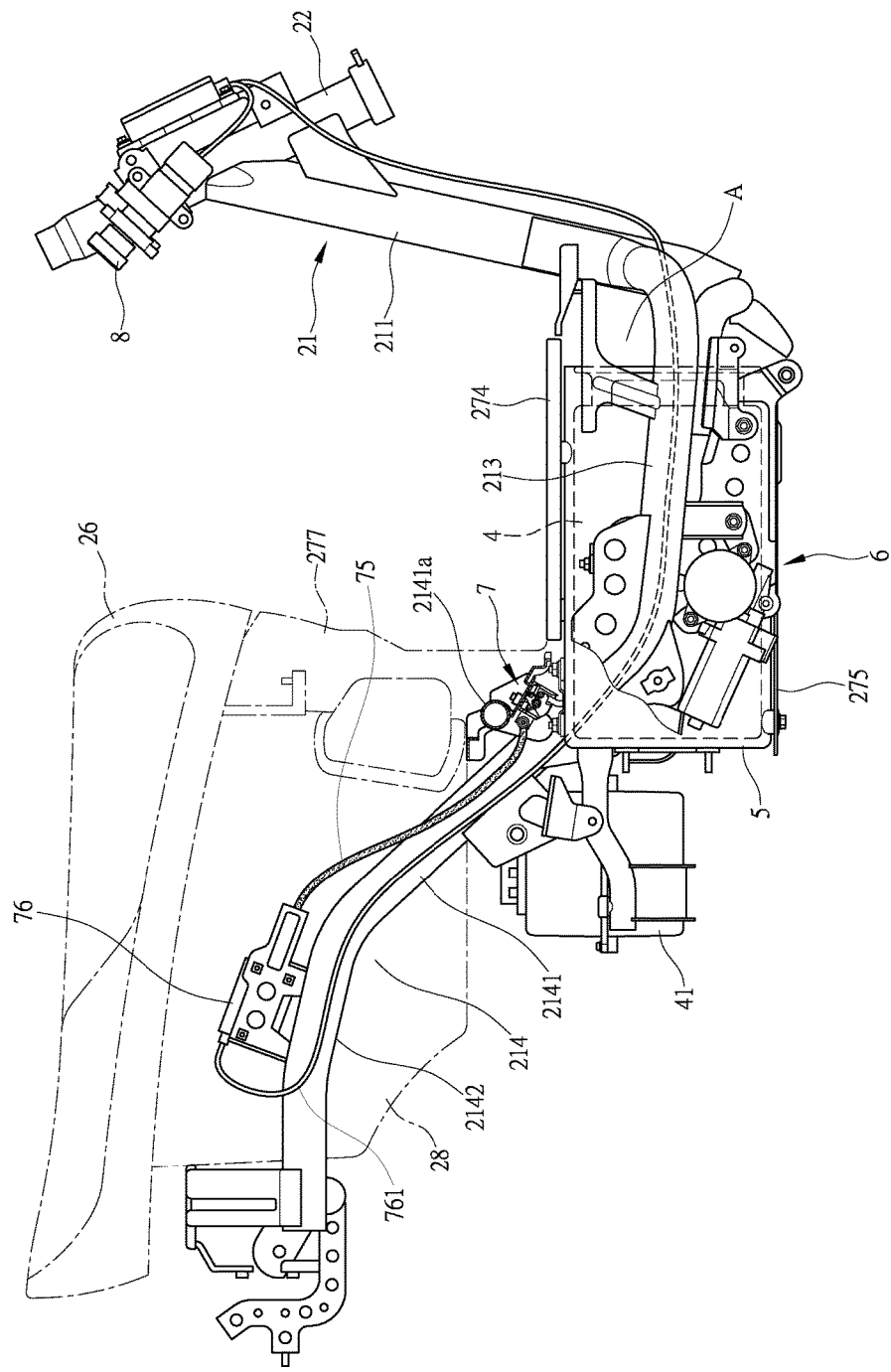
FIG. 9 is a side elevational view, in a schematic form, illustrating the positioning member and the locking device of the battery box according to the present invention.
Figure 10:
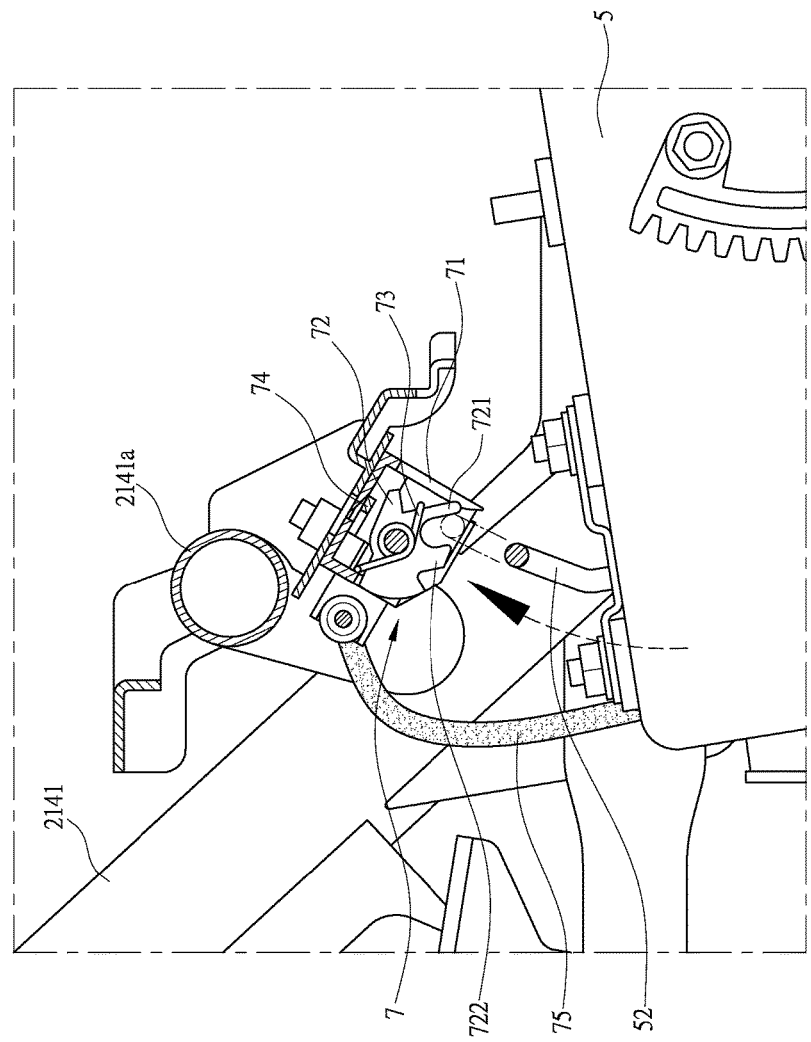
FIGS. 10 and 11 are schematic views illustrating a locking operation of the positioning member and the locking device of the battery box according to the present invention.
Figure 11:
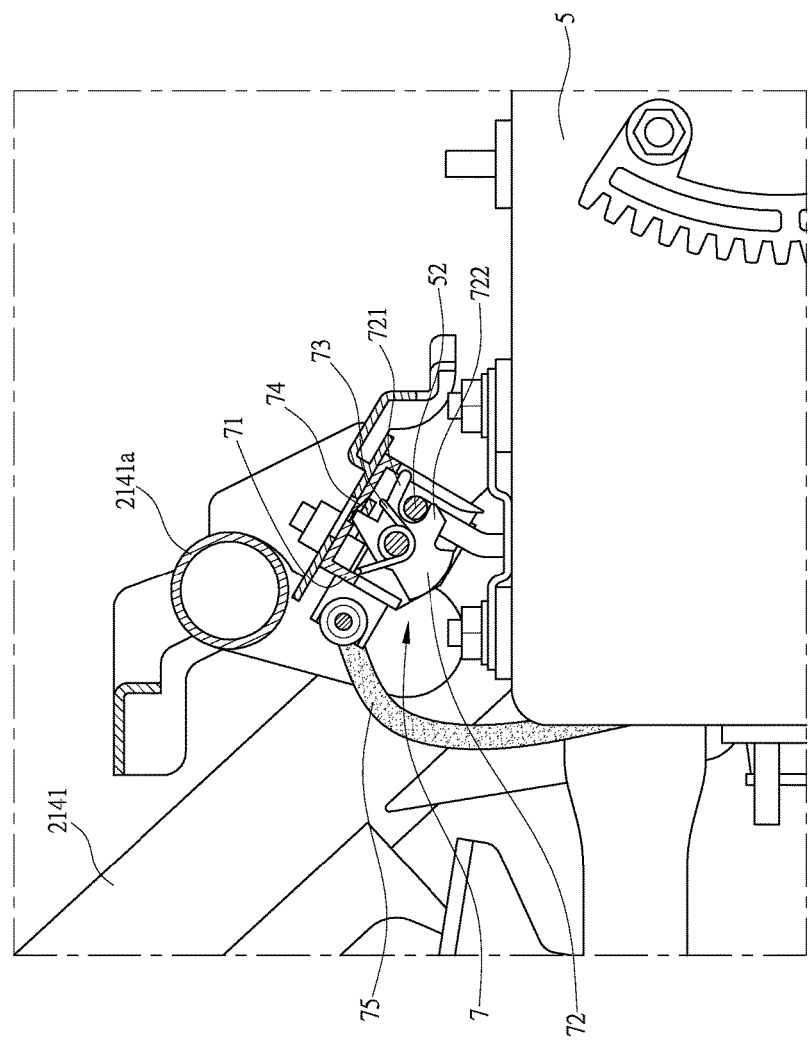
Figure 12:
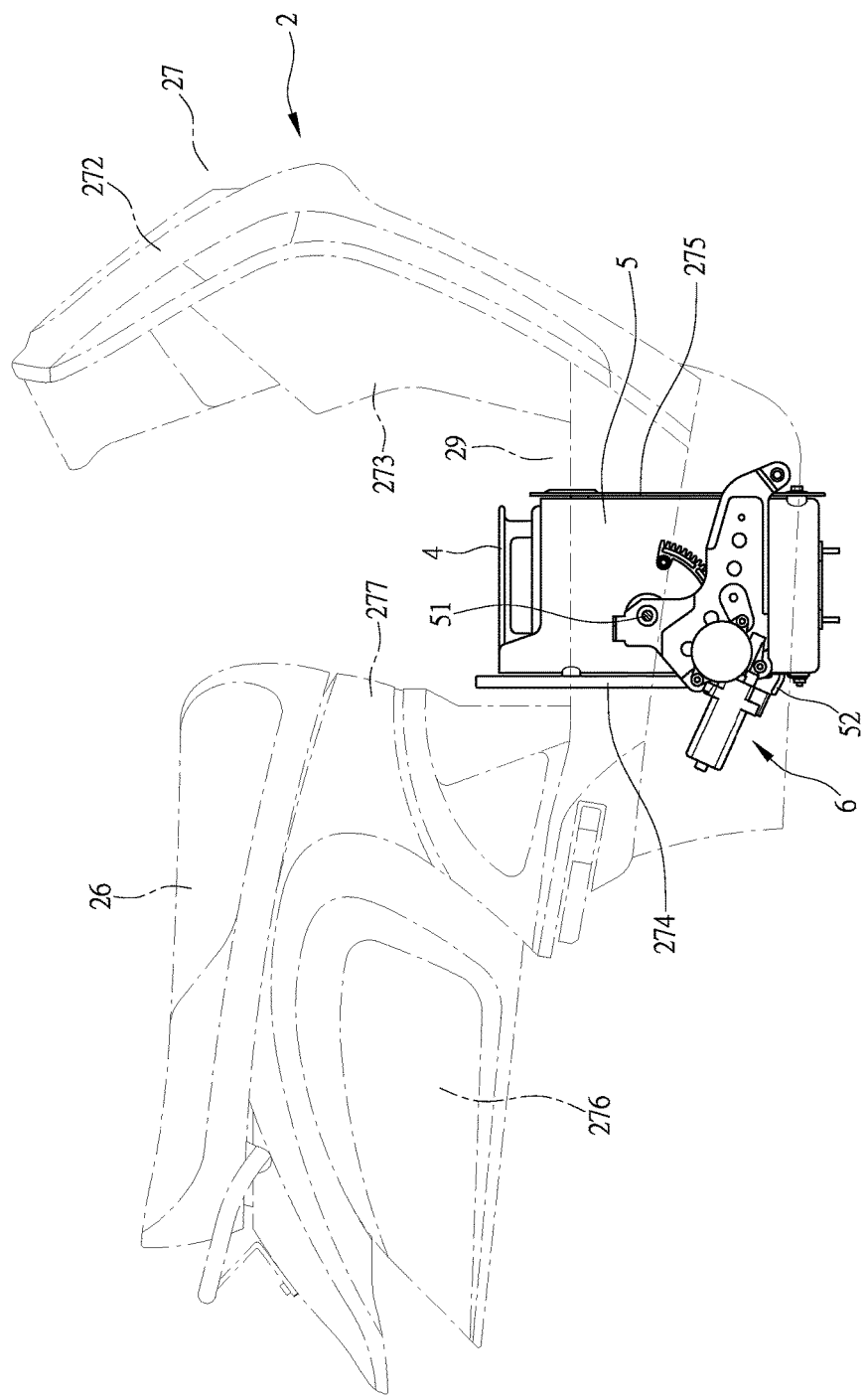
FIG. 12 is a schematic view illustrating opening of the battery box the electric vehicle according to the present invention.

As shown in FIG. 9, the present invention further provides the control cable 75 connected to an electro-mechanical controller 76. The electro-mechanical controller 76 can be embodied as an electromagnetic valve in an example of reduction into practice. The electro-mechanical controller 76 is electrically connected through an electrical cable 761 to the operation unit 8 as a main switch lock or a bar or an electronic switch. A main switch lock is taken as an example of the operation unit 8 in the drawings for illustration. As such, the operation unit 8 may control operation of the electro-mechanical controller 76 and the electro-mechanical controller 76 drives the control cable 75 to move, and the control cable 75 may make the constraint slide block 74 release the constrained condition of the positioning hook 72 to thereby release the positioning hook 72 from the hooking state to achieve a mechanical control measure.

As shown in FIGS. 4, 7, 10, 11, and 12, to lift and remove the battery 4 that is received and stored in the battery box 5 for maintenance or charging, a user may operate the operation unit 8 to cause the locking device 7 to release the hooking state of the battery box 5. Under this condition, the battery box 5 may be moved by the opening device 6 (or turned manually) to cause the battery box 5 to rotate about a rotation center defined by the support shafts 51 toward the vehicle body front-rear direction to an open position, in order to be opened in a condition of generally defining a right angle with respect to a ground surface. Under this condition, a rear end (lower end) of the battery box 5 projects beyond a lower edge of the receiving space A in a direction toward the ground surface, so that the user may withdraw and remove the battery 4 from the battery box 5. When the battery 4 is put into and stored in the battery box 5 again and the battery box 5 is once again received in the receiving space A of the tread section 29, the battery box 5 can be moved by the opening device 6 (or turned manually) to cause the battery box 5 to rotate about the rotation center defined by the support shafts 51 toward the vehicle body front-rear direction to a storage position. Under this condition, the positioning member 52 on the battery box 5 pushes an upper hook section 721 of the positioning hook 72 of the locking device 7 such that a lower hook section 722 of the positioning hook 72 hooks onto the positioning member 52 to form a locking and positioning condition of the battery box 5. As such, on the one hand, lifting and removing the battery is made easy, and on the other hand, an effect of locking the battery box 5 is ensured to thereby improve burglarproofness of the battery 4.

Figure 13:
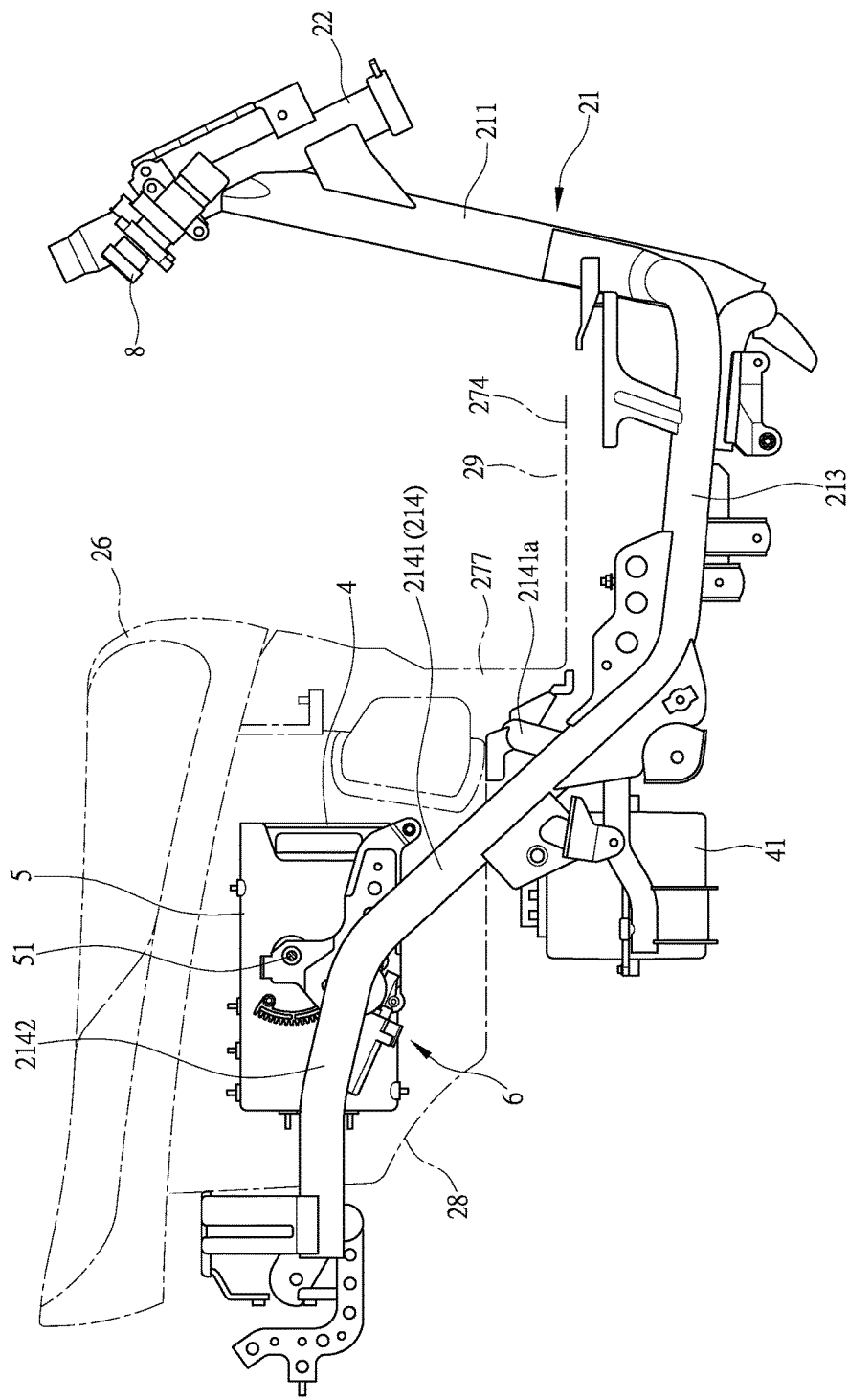
FIG. 13 shows another embodiment of the arrangement of the battery box of the electric vehicle according to the present invention.

As shown in FIG. 13, in putting the present invention into practice, the battery box 5 further can be arranged, in a manner of being shaft-supported leftward and rightward, on the side frame sections 2142 of the left and right pairwise rear frames 214 of the frame unit 21. Speaking more precisely, the battery box 5 is shaft-supported in the article storage box 28, so that a space of the electric vehicle 2 can be fully utilized and the battery 4 that is received in the battery box 5 is provided with feature of shielding.

Figure 14:
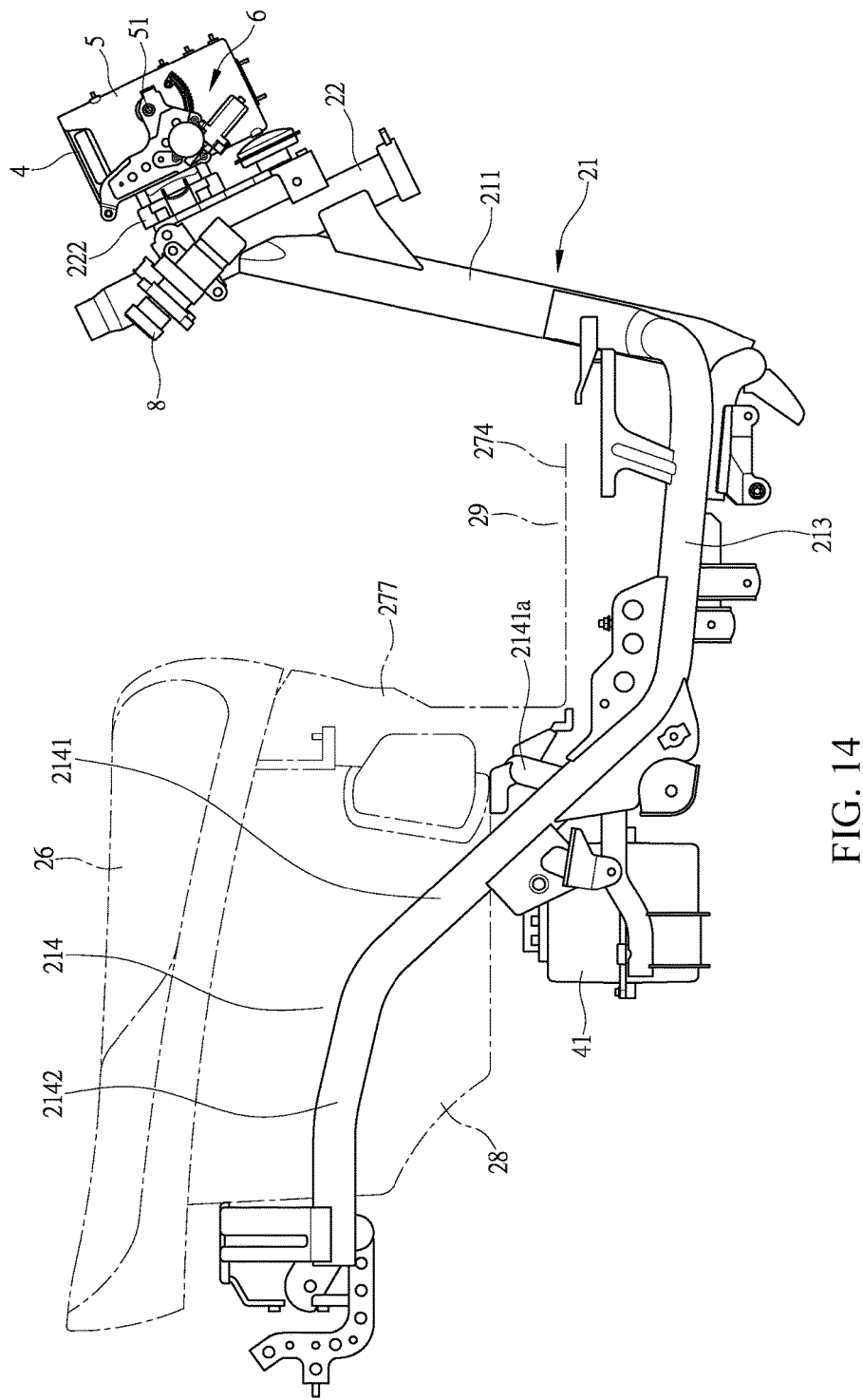
FIG. 14 shows a further embodiment of the arrangement of the battery box of the electric vehicle according to the present invention.

As shown in FIG. 14, in putting the present invention into practice, the head tube 22 of the frame unit 21 is provided, on a front side thereof, with a mounting frame 222. The mounting frame 222 allows the battery box 5 to arrange in a manner of being shaft-supported leftward and rightward, so that a space of the electric vehicle 2 can be fully utilized and the battery 4 that is received in the battery box 5 is provided with feature of shielding.

The primary efficacy of the present invention is that a battery box 5 is provided with a positioning member 52 and a transverse tube 2141a of a frame unit 21 is provided with a locking device 7. The locking device comprises a positioning hook 72 and the positioning hook 72 is operable to apply an action of hooking and locking to the positioning member 52 so that an effect of locking and positioning is achieved for a battery box 5 that receives and holds a battery 4 in a stored condition to thereby improve the easiness of lifting and removal of the battery 4 and to ensure an effect of locking of the battery box 4 to thus improve burglar-proofness of the battery 4.

The second efficacy of the present invention is that a locking device 7 is mounted on a transverse tube 2141a of a frame unit 21 and a positioning member 52 is mounted on a battery box 5 so that easiness of arrangement of the locking device 7 and the positioning member 52 can be enhanced and a space of the electric vehicle 2 can be fully used.

The third efficacy of the present invention is that rear frames 214 are provided with rise sections 2141 and side frame sections 2141 and a transverse tube 2141a is arranged on the rise sections 2141, the locking device being mounted on the transverse tube 2141a; a battery box 5 has a positioning member 52 that is provided on an external upper surface thereof at a location that is closer to a rear side of a vehicle body than support shafts 51 of the battery box 5 so that easiness of arrangement of the locking device 7 and the positioning member 52 can be enhanced and a space of the electric vehicle 2 can be fully used.

The fourth efficacy of the present invention is that a locking device 7 is arranged on a transverse tube 2141a in a manner of slightly inclining in a direction toward a rear side of a vehicle body and a battery box 5 and a positioning member 52 is arranged on an external surface of the battery box 5 in a manner of slightly inclining toward a front side of the vehicle body so that an effect of locking between the locking device 7 and the positioning member 52 can be enhanced and a space of the electric vehicle 2 can be fully used.

The fifth efficacy of the present invention is that a locking device 7 comprises a positioning seat 71, a positioning hook 72 pivotally mounted on the positioning seat 71, a torsion spring 73 arranged at one side of the positioning hook 72 to cause the positioning hook 72 to take a position returning operation, and a constraint slide block 74 that is mounted on the positioning seat 71 and constrains the positioning hook 72 to locking engagement and locking release, the positioning member 52 being a U-shaped buckle so that an effect of locking between the locking device 7 and the positioning member 52 can be enhanced.

The sixth efficacy of the present invention is that an article storage box 28 is mounted on a frame unit 21 and a locking device 7 is arranged between the article storage box 28 and a battery box 5 so that a space of the electric vehicle can be fully used.

The seventh efficacy of the present invention is that a constraint slide block 7 has an end connected to a control cable 75 and the control cable 75 is connected to an operation unit 8, the operation unit 8 being a main switch lock or a pull bar or a button, so that operability of the locking device 7 can be enhanced.

The eighth efficacy of the present invention is that a constraint slide block 74 has an end connected to a control cable 75 and the control cable 75 is connected to an electro-mechanical controller 76, the electro-mechanical controller 76 being connected to an operation unit 8, the operation unit 8 being a main switch lock or a bar or en electronic switch, so that operability of the locking device 7 can be enhanced.

The ninth efficacy of the present invention is that a central vehicle body cover 277 is arranged at a lower side of a front end of a seat section 26 and a battery box 5 is received and stored in a receiving space A defined by a left tread tube 212, a right tread tube 213, a tread board 274 and a bottom cover 275, such that at least a portion of a rear end of the battery box 5 is extended further toward a rear side of a vehicle body than the central vehicle body cover 277, so that a battery box 5, after being enlarged, interfering with other components can be avoided, thereby enhancing utilization of the battery box 5.

The tenth efficacy of the present invention is that a tread board 274 is fixed to an upper surface of a battery box 5 and a bottom cover 275 is arranged on a lower surface of the battery box 5; the tread board 274 on the upper surface of the battery box 5 and the bottom cover 275 on the lower surface of the battery box 5 are openable in synchronization with the battery box 5 and thus, when the battery box 5 is opened in a condition of being generally at a right angle with respect to a ground surface, a rear end of the battery box 5 projects beyond a lower edge of a receiving space A in a direction toward the ground surface, so that withdrawal of a battery 4 from the battery box 5 by a user is made easy and at the same time, the battery box 5, after being enlarged, interfering with other components can be avoided, thereby enhancing utilization of the battery box 5.

The eleventh efficacy of the present invention is that an article storage box 28 is provided on side frame sections 2142 of a frame unit 21 and a battery box 5 is shaft-supported on the side frame sections 2142 of the frame unit 21 in a manner of being shaft-supported in a vehicle body left-right direction, and is received in the article storage box 28, so that a space of an electric vehicle 2 can be fully used and a battery 4 received in the battery box 5 is provided with a feature of shielding.

The twelfth efficacy of the present invention is that a head tube 22 of a frame unit 21 is provided with a mounting frame 222 and a battery box 5 is shaft-supported on the mounting frame 222, in a manner of being shaft-supported in a vehicle body left-right direction, so that a space of an electric vehicle 2 can be fully used and a battery 4 received in the battery box 5 is provided with a feature of shielding.

The thirteenth efficacy of the present invention is that an electro-mechanical controller 75 is provided as an electro-magnetic valve and an operation unit 8 controls operation of the electromagnetic valve so that the electromagnetic valve drives a control cable 75 and the control cable 75 is caused to make a constraint slide block 74 to release a constrained condition of a positioning hook 72 to allow the positioning hook 72 to release a hooking state, so that operability of a locking device 7 is enhanced.

I claim:

1. A battery box locking structure of an electric vehicle, wherein the electric vehicle at least comprises a frame unit and a vehicle body cover unit that covers the frame unit; the frame unit comprises tread tubes and rear frames extending toward a rear side of a vehicle body, the tread tubes being arranged in a left and right pairwise form as a left tread tube and a right tread tube; the vehicle body cover unit at least comprises a tread board that shields the left tread tube and the right tread tube; a receiving space is defined under the tread board and receiving space receives therein a battery box, the battery box receiving and holding therein a battery that supplies electrical power to a driving motor that drives the electric vehicle, characterized in that the battery box has two sides that are provided with support shafts, and the battery box are shaft-supported on the left tread tube and the right tread tube by the support shafts in a vehicle body left-right direction, so that the battery box is rotatable about a rotation center defined by the support shafts in a vehicle body front-rear direction to an open position or a storage position; a locking device is mounted to the frame unit and the locking device is connected to a control cable, the control cable being connected to an operation unit; a positioning member is provided on an outside of the battery box and the locking device is operable to hook and lock the positioning member so that the operation unit is operable to cause the locking device to hook and lock the positioning member or to release the positioning member from being hooked and locked.

2. A battery box locking structure of an electric vehicle, wherein the electric vehicle at least comprises a frame unit and a vehicle body cover unit that covers the frame unit; the frame unit comprises tread tubes and rear frames extending toward a rear side of a vehicle body, the tread tubes being arranged in a left and right pairwise form as a left tread tube and a right tread tube; the vehicle body cover unit at least comprises a tread board that shields the left tread tube and the right tread tube; a receiving space is defined under the tread board and receiving space receives therein a battery box, the battery box receiving and holding therein a battery that supplies electrical power to a driving motor that drives the electric vehicle, characterized in that the battery box has two sides that are provided with support shafts, and the battery box are shaft-supported on the left tread tube and the right tread tube by the support shafts in a vehicle body left-right direction, so that the battery box is rotatable about a rotation center defined by the support shafts in a vehicle body front-rear direction to an open position or a storage position; the frame unit comprises a transverse tube and a locking device is mounted to the transverse tube, a positioning member being provided on an outside of the battery box; the locking device is connected to a control cable, the control cable being connected to an operation unit; the locking device is operable to hook and lock the positioning member so that the operation unit is operable to cause the locking device to hook and lock the positioning member or to release the positioning member from being hooked and locked.

3. The battery box locking structure of the electric vehicle according to claim 1, wherein the rear frames comprise rise sections and side frame sections, a transverse tube being arranged on the rise sections, the locking device being mounted to the transverse tube; and the positioning member is provided on an external upper surface of the battery box at a location closer to the rear side of the vehicle body than the support shafts of the battery box.

4. The battery box locking structure of the electric vehicle according to claim 3, wherein the locking device is arranged on the transverse tube in a manner of slightly inclining in a direction toward the rear side of the vehicle body and the battery box and the positioning member is arranged on the external surface of the battery box in a manner of slightly inclining toward a front side of the vehicle body.

5. The battery box locking structure of the electric vehicle according to claim 1, wherein the locking device comprises a positioning seat, a positioning hook pivotally mounted on the positioning seat, a torsion spring arranged at one side of the positioning hook to cause the positioning hook to take a position returning operation, and a constraint slide block that is mounted on the positioning seat and constrains the positioning hook to locking engagement and locking release, the positioning member being a U-shaped buckle.

6. The battery box locking structure of the electric vehicle according to claim 1, wherein an article storage box is mounted on the frame unit and the locking device s arranged between the article storage box and the battery box.

7. The battery box locking structure of the electric vehicle according to claim 5, wherein the constraint slide block has an end connected to the control cable and the control cable is connected to the operation unit, the operation unit being a main switch lock or a pull bar or a button.

8. The battery box locking structure of the electric vehicle according to claim 5, wherein the constraint slide block has an end connected to the control cable, the control cable being connected to an electro-mechanical controller, the electro-mechanical controller being connected to the operation unit, the operation unit being a main switch lock or a bar or an electronic switch.

9. The battery box locking structure of the electric vehicle according to claim 1, wherein the frame unit comprises a seat section, and the vehicle body cover unit comprises a central vehicle body cover; the central vehicle body cover is arranged at a lower side of a front end of the seat section, the battery box being received in the receiving space defined by the left tread tube, the right tread tube, the tread board and a bottom cover, at least a portion of a rear end of the battery box extending further toward the rear side of the vehicle body than the central vehicle body cover.

10. The battery box locking structure of the electric vehicle according to claim 1, wherein a bottom cover is arranged below of the tread board; the tread board is fixed to an upper surface of the battery box and the bottom cover is fixed to a lower surface of the battery box; the tread board on the upper surface of the battery box and the bottom cover on the lower surface of the battery box are openable in synchronization with the battery box, so that when the battery box is opened to a condition of being generally at a right angle with respect to a ground surface, a rear end of the battery box projects beyond a lower edge of the receiving space in a direction toward the ground surface.

11. The battery box locking structure of the electric vehicle according to claim 1, wherein the frame unit comprises side frame sections arranged in a left and right pairwise form, an article storage box being provided on the side frame sections of the frame unit, the battery box being shaft-supported on the side frame sections of the frame unit in a manner of being shaft-supported in the vehicle body left-right direction, and is received in the article storage box.

12. The battery box locking structure of the electric vehicle according to claim 1, wherein the frame unit further comprises a head tube, the head tube of the frame unit being provided with a mounting frame, the battery box being shaft-supported on the mounting frame in a manner of being shaft-supported in the vehicle body left-right direction.

13. The battery box locking structure of the electric vehicle according to claim 8, wherein the electro-mechanical controller comprises an electromagnetic valve; the operation unit controls operation of the electromagnetic valve, the electromagnetic valve driving the control cable, the control cable causing the constraint slide block to release a constrained condition of the positioning hook to allow the positioning hook to release a hooking state.

14. The battery box locking structure of the electric vehicle according to claim 2, wherein the locking device comprises a positioning seat, a positioning hook pivotally mounted on the positioning seat, a torsion spring arranged at one side of the positioning hook to cause the positioning hook to take a position returning operation, and a constraint slide block that is mounted on the positioning seat and constrains the positioning hook to locking engagement and locking release, the positioning member being a U-shaped buckle.

15. The battery box locking structure of the electric vehicle according to claim 3, wherein the locking device comprises a positioning seat, a positioning hook pivotally mounted on the positioning seat, a torsion spring arranged at one side of the positioning hook to cause the positioning hook to take a position returning operation, and a constraint slide block that is mounted on the positioning seat and constrains the positioning hook to locking engagement and locking release, the positioning member being a U-shaped buckle.

16. The battery box locking structure of the electric vehicle according to claim 4, wherein the locking device comprises a positioning seat, a positioning hook pivotally mounted on the positioning seat, a torsion spring arranged at one side of the positioning hook to cause the positioning hook to take a position returning operation, and a constraint slide block that is mounted on the positioning seat and constrains the positioning hook to locking engagement and locking release, the positioning member being a U-shaped buckle.

17. The battery box locking structure of the electric vehicle according to claim 2, wherein an article storage box is mounted on the frame unit and the locking device s arranged between the article storage box and the battery box.

18. The battery box locking structure of the electric vehicle according to claim 14, wherein the constraint slide block has an end connected to the control cable and the control cable is connected to the operation unit, the operation unit being a main switch lock or a pull bar or a button.

19. The battery box locking structure of the electric vehicle according to claim 15, wherein the constraint slide block has an end connected to the control cable and the control cable is connected to the operation unit, the operation unit being a main switch lock or a pull bar or a button.

20. The battery box locking structure of the electric vehicle according to claim 16, wherein the constraint slide block has an end connected to the control cable and the control cable is connected to the operation unit, the operation unit being a main switch lock or a pull bar or a button.

21. The battery box locking structure of the electric vehicle according to claim 14, wherein the constraint slide block has an end connected to the control cable, the control cable being connected to an electro-mechanical controller, the electro-mechanical controller being connected to the operation unit, the operation unit being a main switch lock or a bar or an electronic switch.

22. The battery box locking structure of the electric vehicle according to claim 15, wherein the constraint slide block has an end connected to the control cable, the control cable being connected to an electro-mechanical controller, the electro-mechanical controller being connected to the operation unit, the operation unit being a main switch lock or a bar or an electronic switch.

23. The battery box locking structure of the electric vehicle according to claim 16, wherein the constraint slide block has an end connected to the control cable, the control cable being connected to an electro-mechanical controller, the electro-mechanical controller being connected to the operation unit, the operation unit being a main switch lock or a bar or an electronic switch.

24. The battery box locking structure of the electric vehicle according to claim 2, wherein the frame unit comprises a seat section, and the vehicle body cover unit comprises a central vehicle body cover; the central vehicle body cover is arranged at a lower side of a front end of the seat section, the battery box being received in the receiving space defined by the left tread tube, the right tread tube, the tread board and a bottom cover, at least a portion of a rear end of the battery box extending further toward the rear side of the vehicle body than the central vehicle body cover.

25. The battery box locking structure of the electric vehicle according to claim 2, wherein a bottom cover is arranged below of the tread board; the tread board is fixed to an upper surface of the battery box and the bottom cover is fixed to a lower surface of the battery box; the tread board on the upper surface of the battery box and the bottom cover on the lower surface of the battery box are openable in synchronization with the battery box, so that when the battery box is opened to a condition of being generally at a right angle with respect to a ground surface, a rear end of the battery box projects beyond a lower edge of the receiving space in a direction toward the ground surface.

26. The battery box locking structure of the electric vehicle according to claim 2, wherein the frame unit comprises side frame sections arranged in a left and right pairwise form, an article storage box being provided on the side frame sections of the frame unit, the battery box being shaft-supported on the side frame sections of the frame unit in a manner of being shaft-supported in the vehicle body left-right direction, and is received in the article storage box.

27. The battery box locking structure of the electric vehicle according to claim 2, wherein the frame unit further comprises a head tube, the head tube of the frame unit being provided with a mounting frame, the battery box being shaft-supported on the mounting frame in a manner of being shaft-supported in the vehicle body left-right direction.

28. The battery box locking structure of the electric vehicle according to claim 21, wherein the electro-mechanical controller comprises an electromagnetic valve; the operation unit controls operation of the electromagnetic valve, the electromagnetic valve driving the control cable, the control cable causing the constraint slide block to release a constrained condition of the positioning hook to allow the positioning hook to release a hooking state.

29. The battery box locking structure of the electric vehicle according to claim 22, wherein the electro-mechanical controller comprises an electromagnetic valve; the operation unit controls operation of the electromagnetic valve, the electromagnetic valve driving the control cable, the control cable causing the constraint slide block to release a constrained condition of the positioning hook to allow the positioning hook to release a hooking state.

30. The battery box locking structure of the electric vehicle according to claim 23, wherein the electro-mechanical controller comprises an electromagnetic valve; the operation unit controls operation of the electromagnetic valve, the electromagnetic valve driving the control cable, the control cable causing the constraint slide block to release a constrained condition of the positioning hook to allow the positioning hook to release a hooking state.

\* \* \* \* \*